United States Patent [19]

Phalangas et al.

[11] 4,137,969
[45] Feb. 6, 1979

[54] PROCESS FOR RECOVERING OIL FROM SUBTERRANEAN FORMATIONS

[75] Inventors: Charalambos J. Phalangas; Alfred J. Restaino, both of Wilmington, Del.; HanBo Yun, Trenton, N.J.

[73] Assignee: Marathon Oil Company, Findlay, Ohio

[21] Appl. No.: 761,041

[22] Filed: Jan. 21, 1977

Related U.S. Application Data

[63] Continuation-in-part of Ser. No. 446,071, Feb. 26, 1974, Pat. No. 4,024,040.

[51] Int. Cl.² ............................................. E21B 43/22
[52] U.S. Cl. .................................... 166/274; 166/275; 204/159.22; 252/8.55 D
[58] Field of Search .................. 252/8.55 D; 166/274, 166/275

[56] References Cited

U.S. PATENT DOCUMENTS

| | | | |
|---|---|---|---|
| 3,493,500 | 2/1970 | Volk et al. | 210/54 |
| 3,658,772 | 4/1972 | Volk et al. | 260/80.3 N |
| 3,764,502 | 10/1973 | Restaino | 204/159.22 |
| 3,841,401 | 10/1974 | Restaino et al. | 252/8.55 X |

*Primary Examiner*—Herbert B. Guynn
*Attorney, Agent, or Firm*—Joseph C. Herring; Jack L. Hummel

[57] ABSTRACT

Improved flooding of oil-bearing formations is obtained by injecting and displacing through the formation a water-soluble, substantially linear, high molecular weight polymer obtained by irradiating an aqueous solution of an ethylenically unsaturated monomer and a water-soluble salt under controlled conditions of concentration, radiation intensity, conversion, and total radiation dose.

21 Claims, No Drawings

PROCESS FOR RECOVERING OIL FROM SUBTERRANEAN FORMATIONS

CROSS REFERENCE TO RELATED APPLICATIONS

This is a continuation-in-part application of our copending application identified as U.S. Ser. No. 446,071, filed Feb. 26, 1974, now U.S. Pat. No 4,024,040 and titled "Polymerization of Unsaturated Monomer with Radiation in the Presence of Salt".

Field of the Invention

This invention relates to injecting a water-soluble polymer into a subterranean formation through an injection well and displacing it toward a production well to recover oil.

Description of the Prior Art

High molecular weight water-soluble polymers impart improved mobility control to oil recovery processes, e.g. waterflooding. Mobility control is obtained by reducing the permeability of the reservoir rock and/or imparting viscosity control to a flood being displaced through an oil bearing formation. Beeson in U.S. Pat. No. 2,771,138 teaches flooding with naturally occurring gums, copolymers of methyl vinyl ether and maleic anhydride, condensation products of fatty acids, and hydroxy amines, sodium polyacrylate, polyacrylic and poly (sodium methacrylate). Engelhardt et al, in U.S. Pat. No. 2,842,492, uses copolymers of ethylenically unsaturated carboxylic acid and at least one ethylenically unsaturated noncarboxylic compound, the calcium salt of the copolymer being water-soluble, to obtain mobility control is waterflooding. U.S. Pat. No. 3,002,960 to Kolodny teaches waterflooding with copolymers of acrylamide and acrylic acid wherein the intrinsic viscosities of the copolymers are at least 12 and preferably greater than 18 Zerweck et al, in U.S. Pat. No. 3,020,953, uses a polyacrylic acid amide to obtain improved waterflooding.

Alcohol adducts of copolymers of vinyl aromatic and maleic anhydride are useful in waterflooding, e.g. U.S. Pat. No. 3,025,237 to Roper. Also, Roper in U.S. Pat. Nos. 3,025,237 and 3,070,158 suggests that copolymers in acrylamide and acrylic acid are useful in waterflooding. Morgan in U.S. Pat. No. 2,775,557 teaches copolymers of acrylic acid and acrylamide are useful as are partially hydrolyzed polyacrylamides to impart fluid loss control properties to drilling muds. Siegel et al in Canadian Pat. No. 683,476 teaches that radiation polymerized acrylamide may be used as a waterflood additive.

Partially hydrolyzed high molecule weight polyacrylamides are useful as mobility and viscosity control agents in waterflooding processes. Sandiford et al in U.S. Pat. No. 2,827,964 teaches that 0.8–10% of the original amide groups in polyacrylamide can be hydrolyzed to carboxyl groups to obtain such polymers —the polyacrylamide can contain up to 15% by weight of other polymerizable vinyl compounds. McKennon in U.S. Pat. No. 3,039,529 teaches that "hydrolyzed polyacrylamide having from 12–67% of the original carboxy-amide groups hydrolyzed to carboxyl groups" are useful to impart improved waterflooding characteristics. The McKennon polyacrylamides to be hydrolyzed can contain up to 10% by weight of a polymerizable vinyl compound.

U.S. Pat. No. 3,841,401 to Restaino et al teaches the use of radiation induced polymers as mobility control agents. These polymers are prepared by irradiating an aqueous solution containing 10–60% monomer which is preferably 25–99% acrylamide and 75–1% sodium acrylate.

The prior art reveals a number of methods for preparing water-soluble polymers of ethylenically unsaturated monomers. For example, ethylenically unsaturated monomers have been polymerized in suspension, in emulsion, and in solution employing chemical, free-radical initiators to initiate polymerization. In suspension or emulsion polymerization, the chemical catalyst is added to a mixture of organic solvent, water, monomer, suspending or emulsifying agents, and, optionally, a polymer precipitant. By these techniques, it is possible to obtain high conversion of monomer to polymer in products of high molecular weight. However, the polymer must be separated from excess quantities of solvent and additives in order to obtain the product in useful form. Solution polymerization via chemical catalyst has not been satisfactory for forming high molecular weight polymers because the polymerization cannot be carried out to high conversion and high molecular weights at practical concentrations of monomer in solution. Moreover, chemically catalyzed polymerizations require careful control of polymerization temperature to avoid decreases in molecular weight or premature cross-linking and insolubilization of the polymer. In order to achieve practical levels of conversion, molecular weight, and water-solubility, the rate of such polymerization must generally be controlled to require reaction periods of several hours to several days. It has been proposed to increase the polymerization rate of chemically catalyzed polymerization reactions by conducting the polymerization in the presence of a water-soluble salt. While the salt does appear to increase the polymerization rate without substantially reducing the molecular weight of the polymer, the reaction time required for the preparation of very high molecular weight polymers is still unduly long.

In recent years, attention has been focused on the polymerization of ethylenically unsaturated monomers under the influence of high energy ionizing radiation, for example, gamma radiation. Numerous processes have been developed for the preparation of water-soluble, substantially linear, ultrahigh molecular weight polymers of ethylenically unsaturated monomers, e.g. U.S. Pat. No. 3,841,401 to Restaino et al. The reaction time required for the preparation of high molecular weight polymers under the influence of gamma radiation is very short, usually less than one hour. One disadvantage of these radiation-induced polymerization processes, however, has been that at the higher monomer concentrations and lower radiation intensity required to produce the high molecular weight polymers, the polymerization process must be terminated before all the monomer has been converted to polymer in order to avoid undesirable amounts of branching and cross-linking of the polymer chains which results in the formation of water-insoluble polymers. This branching and cross-linking of the polymer to form water-insoluble products occurs because the number of free radicals formed directly or indirectly by irradiation of the polymer molecules increases as the polymer concentration in the irradiated solution increases, and therefore, the probability of two of these polymer radicals finding each other in close proximity to react and form linkages between the polymer molecules is greater, and because the rate of polymerization decreases as the monomer to polymer conversion increases, and therefore the radiation dose required per unit of percent conversion increases. In most cases the radiation required to convert the last few percentage points of monomer to polymer is a significant portion of the total radiation dose. Such a big radiation dose delivered to the polymerization system at a time when the polymer concentration is high will cross-link the polymer and result in the formation of water-insoluble products. Therefore, if radiation is used for the synthesis of very high molecular weight, water-soluble polymers from concentrated aqueous solutions, the polymerization reaction must be stopped short of complete conversion if cross-linking and insolubilization of the polymer is to be avoided.

SUMMARY OF THE INVENTION

In accordance with the present invention it has been found that improved flooding of oil-bearing formations is obtained with very high molecular weight, substantially linear, water-soluble polymers prepared in very short reaction time and at conversion of monomer to polymer levels of up to substantially 100% by a process which comprises irradiating an aqueous monomer solution containing at least one water-soluble salt of the class hereinafter defined, under carefully controlled conditions of monomer concentration, radiation intensity, total radiation dose, and monomer to polymer conversion as set forth hereinafter. The presence of the salt in the aqueous solution increases the rate of polymerization, and thereby shortens reaction times. More importantly, and unexpectedly, the salt increases significantly the molecular weight of the polymer formed at any given level of conversion of monomer to polymer. The salt also gives a more linear polymer, as shown by its low Huggins value, at any given molecular weight. The presence of the salt also permits the formation of ultra high molecular weight polymers wherein substantially all of the monomer is converted to polymer. Such polymers obtain improved oil recovery results.

PREFERRED EMBODIMENTS OF THE INVENTION

The expression "water-soluble polymer" when used in this application means that at least 90% by weight of the polymer dissolves in water in accordance with the following test: the polymer is dispersed in water, in a weight ratio of 1 to 1,000 respectively, by stirring the mixture with a magnetic stirrer at 200 r.p.m. for a period of two hours. A 100 gram aliquot of the resultant dispersion-solution is filtered through a 200 mesh screen. The 200 mesh screen is then washed with 300 cc. of distilled water. The filter cake remaining on the 200 mesh screen is dried at a temperature of about 115° C. until constant weight. The dried portion, which is the insoluble part of the polymer, must be less than 10 weight percent of the polymer contained in the 100 gram aliquot. This is determined by dividing the weight of the dried portion by the weight of polymer in the 100 gram aliquot. The water temperature used for this test is 25° C.

The expression "cationic polymer" when used in this application means polymer consisting of 1% to 100% of polymerized cationic monomer and 0 to 99% of polymerized nonionic monomer.

The expression "anionic polymer" when used in this application means polymer consisting of 1% to 100% of polymerized anionic monomer and 0 to 99% of polymerized nonionic monomer.

The expression "ampholytic polymer" when used in this application means polymer containing at least 1% by weight of polymerized ionic monomer and containing both polymerized anionic monome and polymerized cationic monomer.

The expression "nonionic polymer" when used in this application means polymer containing from 0 to less than 1% by weight of polymerized ionic monomer.

The water-soluble salts which may be used in the process of this invention are those water-soluble salts which are sufficiently soluble in the aqueous reaction medium used herein to furnish a solution containing at least 3% by weight of dissolved salt, based on the total weight of solution, and which are incapable of forming free radical scavengers under the influence of high energy ionizing radiation. In this latter category nitrate and nitrite salts are specifically excluded. Examples of salts which are useful in the process of this invention are: potassium sulfate, potassium chloride, potassium fluoride, potassium bisulfate, tribasic potassium phosphate, dibasic potassium phosphate, monobasic potassium phosphate, sodium sulfate, sodium bisulfate, sodium chloride, tribasic sodium phosphate, dibasic sodium phosphate, monobasic sodium phosphate, lithium sulfate, lithium bisulfate, lithium chloride, ammonium sulfate, ammonium bisulfate, ammonium chloride, tribasic ammonium phosphate, dibasic ammonium phosphate, monobasic phosphate, ammonium fluoride, aluminum sulfate, and aluminum chloride. A preferred class of salts includes sodium chloride, sodium sulfate, sodium bisulfate, potassium chloride, potassium sulfate, potassium bisulfate, ammonium chloride, ammonium sulfate, and ammonium bisulfate. The sodium, potassium, lithium, and ammonium salts may be used to polymerize any of the ethylenically unsaturated monomers described hereinafter, whereas the aluminum salts may be used only to polymerize monomer compositions consisting of from 5% to 100% of cationic monomer and from 0% to 95% of nonionic monomer.

Mixtures of more than one salt may also be used. It has been unexpectedly discovered that in certain instances, a combination of salts gives a high molecular weight polymer and a faster reaction rate than can be obtained with a single salt. Preferred combination of the above salts include mixtures of more than one of the following salts: potassium chloride, potassium sulfate, potassium dibasic phosphate, potassium monobasic phosphate, sodium chloride, sodium sulfate, sodium dibasic phosphate, and sodium monobasic phosphate, wherein the salts are selected to provide at least 10% by weight of one or more salts having a common anion and at least 10% by weight of one or more salts having a second common anion which is different from the first said common anion. Particularly preferred combinations of salts include mixtures of two or more salts selected from the group consisting of sodium chloride, sodium sulfate, and potassium dibasic phosphate.

The amount of salt used depends on the particular salt and reaction conditions used and on the molecular weight and reaction rate desired. In general, the amount of salt employed is from 3%, based on the total weight of solution, to the saturation point of the salt in the monomer solution at 35° C., and preferably from about 4% to saturation. A particularly preferred amount of salt is from about 6% to saturation. Lower amounts of salt are less effective and, for practical purposes, produce no increased benefits. Larger amounts of salt may be used, but do not increase benefits. It has been found that, provided all other variables are kept constant, the molecular weight (intrinsic viscosity) and linearity of the polymer product increase as the amount of dissolved salt increases. A preferred concentration for sodium chloride, potassium chloride, and ammonium chloride is from 8% to saturation. A preferred concentration for sodium sulfate, potassium sulfate, and ammonium sulfate is from 4% to saturation.

The radiation-induced polymerization is effected, in accordance with this invention, by subjecting an aqueous solution of salt and at least one ethylenically unsaturated monomer to high energy ionizing radiation. The radiation employed may be particulate or electromagnetic in nature, and includes accelerated electrons, protons, neutrons, etc., as well as X-rays and gamma rays.

The polymers of the invention may be prepared from water-soluble monomers conforming to the formula

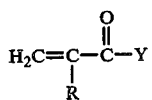

mixtures of such monomers, or water-soluble mixtures of at least one of such monomers with up to 50% by weight of an ethylenically unsaturated monomer selected from the group consisting of vinyl sulfonic acid, alkali metal salts of vinyl sulfonic acid, diacetone acrylamide, and mixtures thereof. In the above formula, R represent hydrogen or methyl and Y represent $-NH_2$, $-OM$,

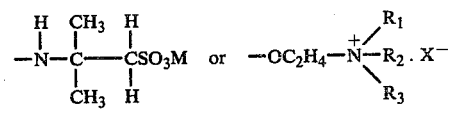

wherein M is hydrogen, $H_4N^+$, alkali metal, or any other cation yielding a water-soluble, polymerizable compound, $R_1$, $R_2$, and $R_3$ are 1 to 4 carbon alkyl radicals and X is an anion. Illustrative examples of monomers conforming to the formula include acrylamide, methacrylamide, 2-acrylamido-2-methylpropanesulfonic acid, acrylic and methacrylic acids and their water-soluble salts, such as their ammonium and alkali metal salts, quaternary salts of dimethylaminoethyl acrylate and dimethylaminoethyl methacrylate. Preferred nitrogen-bearing monomers within the above formula are acrylamide, dimethylaminoethyl acrylate quaternized with methyl chloride, dimethyl sulfate, or diethyl sulfate and dimethylaminoethyl methacrylate quaternized with methyl chloride, dimethyl sulfate, or diethyl sulfate. Preferred combinations of monomers include mixtures of acrylamide and sodium acrylate and mixtures of acrylamide and quaternary salts of dimethylaminoethyl acrylate. The invention also contemplates polymers obtained by polymerizing mixtures of the above defined monomers as well as water-soluble mixtures of such monomers with up to 10% by weight of other water-soluble, copolymerizable, ethylenically unsaturated monomers, for example, vinylimidazole, quaternary salts of vinylimidazole, acrylonitrile and maleic acid, and water-soluble salts of maleic acid, such as the alkali metal salts of maleic acid.

By selection of monomer combinations, polymers may be obtained which are nonionic, cationic, anionic, or ampholytic as desired. By way of illustration, acrylamide yields an essentially nonionic polymer, the quaternary salts of dimethylaminoethyl acrylate or dimethylaminoethyl methacrylate yield cationic polymers, copolymers of acrylamide with acrylic acid or with quaternized acrylic or methacrylic amine salts, are anionic or cationic, respectively, while terpolymers of acrylamide with both acrylic acid and the quaternary compounds are ampholytic.

Irradiation of the monomer is carried out in an aqueous solution containing about 10% to about 40%, and preferably about 10% to about 30% by weight of dissolved monomer. At the lower concentrations of monomer, the product is generally a pourable polymer solution; at concentrations of above about 15% by weight, the product is generally a nonpourable gel. The use of monomer concentrations below about 10% tends to be uneconomical and the use of monomer concentrations much above about 40% tends to restrict the amount of salt which can be dissolved in the monomer solution. Of course, the particular limits of monomer concentration vary somewhat with the particular monomers used and the radiation conditions used; but, in general, values within the ranges stated are satisfactory. It has been found that provided all other variables are kept constant, the intrinsic viscosity of the polymer product increases as the monomer concentration increases.

The intensity of radiation has an effect on the molecular weight of the polymer product obtained and consequently on the intrinsic viscosity of its solutions. In general, the higher molecular weight products are obtained at the lower intensities of radiation. That is, under otherwise identical conditions, the intrinsic viscosity of the polymer tends to increase as the intensity of the radiation used decreases. On the other hand, the degree of conversion which can be obtained before an undue degree of insolubilization takes place is greater at higher intensities of radiation. In view of these considerations, it is usually desirable to employ radiation intensities of at least 1,000 rads and preferably of at least 5,000 rads per hour. In order to obtain the significantly higher molecular weight polymers of this invention, values below about 200,000 rads per hour are desirable; and for producing polymers having molecular weights in the highest range, it is preferred that values below about 100,000 rads per hour be employed.

The total radiation dose may influence the water-solubility of the polymer, as it has been found that too high a radiation dose may render the resulting polymer water-insoluble. It has also been found that under otherwise identical conditions, the intrinsic viscosity of the polymer tends to decrease as the total dose increases. Accordingly, the total radiation dose to which the polymerization system is subjected must be carefully chosen. The particular radiation dose used will depend somewhat on the radiation intensity used, the monomer concentration, the particular monomer employed, the salt concentration, the particular salt used, and on the desired intrinsic viscosity of the polymer to be produced. Although a lower dose may be used, it is generally preferred to use a dose of at least 1,000 rads. The upper limit of radiation dose is that which produces substantial amount of water-insoluble products. However, for most practical purposes, dosages up to about 30,000 rads and preferably up to about 15,000 rads are employed.

Although the polymerization reaction can be stopped at any monomer to polymer conversion, the advantages of this invention are better realized by conversions from 80% to 100% and preferably from 85% to 98%. At these high monomer to polymer conversions the polymerization raw product is less vulnerable to cross-linking by post irradiation polymerization of unreacted monomer and therefore can be safely stored at room or lower temperature or used as such if it is economically preferred. Partial polymerization of salt containing high monomer concentration solutions yields extremely high intrinsic viscosity polymers. However, the raw product of such polymerization has to be immediately processed to powder and the unreacted monomer disposed of or recycled.

The variables of radiation intensity, total radiation dose, salt concentration, and monomer concentration discussed above are interdependent variables. While useful polymers may be prepared at all monomer concentrations, salt concentrations, radiation intensities, and radiation dosages within the ranges given heretofore, all combinations of concentration, dose, and intensity within these ranges may not be used to prepare the water-soluble, high molecular weight polymers. In view of this interdependency of intensity, dose, salt concentration, and monomer concentration, it may be necessary to perform a limited amount of experimentation in order to prepare a polymer having the desired water solubility and intrinsic viscosity. However, this experimentation may be kept to a minimum in view of the disclosure in the numbered examples given hereinafter showing the preparation of a variety of polymers of different intrinsic viscosities and in view of the discussion herein of the effect of intensity, dose, salt concentration, and monomer concentration on the water-solubility and intrinsic viscosity of the polymer. For example, a polymer having an intrinsic viscosity of about 22 deciliters per gram in 2 normal sodium chloride solution at 25.5° C. may be prepared using the reaction conditions employed in Example 2 for the preparation of a polymer having an intrinsic viscosity of 24.2, except that the intensity is increased and/or the monomer or salt concentration is lower. The radiation-induced polymerization reaction may be conducted over a rather wide range of pH. However, it is preferable to avoid the use of very low pH values because some production of undesirable, insoluble products tends to take place if the pH is unduly lowered, particularly with acrylamide base products. On the other hand, very high pH values may result in some hydrolysis and modification of the monomer being reacted, this again being particularly true of acrylamide. Although the particular range will depend to some degree on the particular monomer composition being polymerized and on the particular water-soluble salt used, it may be stated in general that pH values of about 2 to 12 are satisfactory. A preferred pH range for the preparation of anionic polymers is from about 8 to about 11. A preferred pH range for the preparation of cationic polymers is from about 3 to about 8.

The discussion of pH in the preceding paragraph applies primarily when the water-soluble salt used is a potassium, sodium, or lithium salt. When an ammonium salt is used, the pH of the reaction mixture is maintained from about 7 to about 9. When an aluminum salt is used, the pH of the reaction medium is maintained from about 2 to about 5 to avoid precipitation of the salt.

The product of the process of this invention is an aqueous solution of the water-soluble polymer, which may be in the form of a pourable liquid or a nonpourable, rubbery gel, depending upon the polymer concentration and the intrinsic viscosity of the polymer. The bulk viscosity of the polymer solution tends to increase as the polymer concentration and intrinsic viscosity of the polymer increases. The polymer solutions produced, in accordance with this invention, may be admixed with water and used directly or the polymer solution may be concentrated by conventional means or it may be recovered in particulate form, for example, powder form. For example, a nonpourable gel may be finally subdivided and the water removed by conventional drying techniques or the water may be extracted from the subdivided gel with a water-miscible, volatile organic liquid which has no affinity for the copolymer, for example, methanol.

Anionic and nonionic polymers prepared by the process of this invention generally have an intrinsic viscosity of at least 20 deciliters per gram, and preferably at least 25 deciliters per gram. Cationic polymers prepared by the process of this invention generally have an intrinsic viscosity of at least 4 deciliters per gram, and preferably at least 14 deciliters per gram. Although polymers having a lower intrinsic viscosity may be readily prepared by the process of this invention, no advantage is gained by using this process to prepare such low molecular weight polymers. These low molecular weight polymers may be prepared easily in the absence of a water-soluble salt by known processes. Anionic and nonionic polymers having an intrinsic viscosity of 50 deciliters per gram, or higher, and cationic polymers having an intrinsic viscosity of 25 deciliters per gram, or higher, may be prepared by the process of this invention.

For purposes of this application, the intrinsic viscosity of nonionic polymers, cationic polymers, and polymers having an anionic content of below 85% are measured in two normal sodium chloride solution at 25.5° C., and the intrinsic viscosity of polymers having an anionic content of from 85% to 100% are measured in two normal sodium hydroxide solution at 25.5° C. When the intrinsic viscosity of the polymer is measured in water without the presence of salt or sodium hydroxide, values obtained are higher, particularly in the case of ionic polymers and polymers having an intrinsic viscosity of above 10.

Polymers prepared by the process of this invention have a Huggins constant of from 0 to about 0.8, and preferably from 0 to 0.5. A preferred class of anionic and nonionic polymers have a Huggins constant from 0 to about 0.2. A preferred class of cationic polymer has a Huggins constant from about 0.1 to about 0.4.

The Huggins constant of a polymer is a measure of the degree of branching of the polymer. For two polymers having similar molecular weight but different Huggins constant, the lower Huggins constant indicates a more linear polymer. Briefly, the Huggins constant of a polymer, and thus the amount of branching, may be measured from a determination of the plot of the specific viscosity divided by concentration versus the concentration. The slope of this curve divided by the square of the intrinsic viscosity yields the Huggins constant. A more detailed definition of Huggins constant and method for determining Huggins constant of a polymer is found in "Textbook of Polymer Chemistry", Billmeyer, Interscience Publishers, New York, 1957, pages 125–139. For purposes of this application, the Huggins constant of polymers are determined by the process described by Billmeyer and using polymer concentrations below about 0.05 deciliters per gram.

Polymers of this invention are useful in mixtures containing water, e.g. aqueous solutions of the polymer, for flooding purposes. More specifically, the polymer is useful in aqueous solutions containing none or one or more of surfactant (e.g. a sulfonate and preferably a petroleum sulfonate), cosurfactant (e.g. ether, ester, aldehyde, alcohol, and like compounds), hydrocarbon, inorganic acid inorganic base, inorganic salt, organic acid, basic organic compound, organic salt, etc. It is preferred that if other components are present in the water/polymer mixture, they not be reactive with the polymer or by-products of the polymerization process such that the reaction will adversely and substantially influence the injectivity or mobility control properties of the polymer.

The polymer can be injected into the reservoir many ways, e.g. in the front of a waterflood or intermittently during a waterflood, or the aqueous polymer solution can follow an oil-displacing slug (i.e. a slug or fluid that displaces oil from the resevoir). In addition, the polymer can be incorporated into the displacing slug to impart better mobility control. Also, if the injectivity profile of the injection well is to be improved, the polymer solution can precede an oil recovery process. Volume amounts of less than about 5% to about 150% or more PV (pour volume) are preferred when the polymer is injected behind a displacing slug. Also, the polymer can be concentrated in a "spike" slug, e.g. a 10% PV containing large amounts, e.g. up to 2,000 ppm, of polymer. The polymer concentration can be graded from a high at the front portion of the aqueous polymer solution to a low concentration at the back portion of the polymer slug to obtain a more economical design for mobility control. Examples of such designs are taught in U.S. Pat. Nos. 3,467,187 and 3,605,892 to Gogarty et al.

Where a displacement slug is used in conjunction with the aqueous polymer solution, the displacing slug can be immiscible, miscible-like, or miscible. Preferably it is a surfactant containing fluid, e.g. an aqueous sufactant slug. Examples of preferred displacing slugs are found in U.S. Pat. No. 3,254,714 to Gogarty et al; U.S. Pat. Nos. 3,497,006 to Jones et al; 3,506,070 and 3,506,071 to Jones; 3,330,344 and 3,348,611 to Reisberg; 3,126,952 to Jones; 3,163,214 to Csaszar; 3,354,953 to Morris; 3,373,809 to Cook, Jr., 3,302,713 to Ahearn et al; 3,512,586 to Holm; 3,964,548 to Schroeder et al; etc. Preferably the displacing slug is one containing hydrocarbon, water, surfactant, (preferably obtained by sulfonating crude oil or topped crude oil), cosurfactant (alcohol or like compound), and electrolyte.

The aqueous polymer solution can contain additives to impart desired characteristics to the oil recovery process. For example, oxygen scavenging agents, corrosion inhibitors, biocides, antioxidants, viscosity stabilizers, solution stabilizers, and other like agents can be incorporated into the aqueous polymer solution. Generally speaking, any component can be added to the aqueous polymer solution as long as the component(s) is compatible with the polymer and does not impart an "overriding" detrimental influence to the flooding process within the reservoir or the injectivity of the aqueous polymer solution into a well.

The polymers of this invention are particularly useful for flooding high permeability reservoirs, e.g. 250 md. and above. For example, reservoirs having permeabilities of 1,000-2,000 md. can be effectively flooded with these polymers.

The invention will be better understood from a consideration of the following examples which are presented for illustrative purposes and are not to be considered as limiting the scope of this invention. All parts and percentages are by weight unless otherwise specified. The intrinsic viscosities reported are measured in 2 normal sodium chloride solution at 25.5° C., unless otherwise stated.

Manufacture of the Polymers

EXAMPLE 1

240 milliliters of deionized water are added to a 500 milliliter beaker. 0.6 gram of glacial acrylic acid, 30 grams of acrylamide, and 30 grams of sodium sulfate are dissolved in the water. The pH of the resulting solution is adjusted to 10.0 with aqueous sodium hydroxide solution. The solution is then added to an irradiation vessel and flushed with nitrogen for 20 minutes. The solution is irradiated with gamma rays from a cobalt 60 source for 16 minutes at a radiation intensity of 20,000 rads per hour. The reaction product is removed from the radiation source and allowed to stand until it has cooled to room temperature. The monomer to polymer conversion is 94.7%. A portion of the gel is extruded and a weighed amount of the gel strands are added to a beaker containing methanol. The polymer strands are allowed to stand in the methanol overnight. The strands are then ground on a Wiley mill using a 20 mesh screen. The ground product is slurried in methanol, filtered by vacuum filtration, washed three times on a filter with fresh methanol, and partially dried on the filter. The semidried powder is then dried in a vacuum oven for 24 hours at 36° C. The dried polymer powder is soluble in distilled water and has an intrinsic viscosity of 14.8 deciliters per gram and a Huggins constant of 0.27.

EXAMPLE 2

A solution containing 210 milliliters deionized water, 0.9 gram glacial acrylic acid, 45 grams acrylamide, and 45 grams of sodium sulfate are prepared in accordance with the procedure of Example 1 and the pH of the solution adjusted to 9.6 with an aqueous solution of sodium hydroxide. The solution is placed in a reaction vessel, flushed with nitrogen for 20 minutes, and irradiated with gamma rays from a cobalt 60 source for 10 minutes at an intensity of 20,000 rads per hour. The product is then allowed to cool to room temperature. The polymerization product is a nonpourable, rubbery gel and the monomer to polymer conversion is 96.0%. Both the rubbery gel and polymer powder recovered from the gel are soluble in distilled water. The polymer has an intrinsic viscosity of 24.2 deciliters per gram and a Huggins constant of 0.10.

EXAMPLE 3

10 pounds, 10 ounces deionized water, 6.25 ounces of sodium hydroxide, 11 ounces of glacial acrylic acid, and 1 pound, 3.25 ounces of anhydrous sodium sulfate, and 2 pounds. 1.5 ounces of acrylamide are added to a 5 gallon polyethylene vessel in the order listed. The pH of the solution is adjusted to 9.5 with sodium hydroxide. The monomer solution is then irradiated for 16 minutes with gamma rays from a cobalt 60 source at an intensity of 20,000 rads per hour. The monomer to polymer conversion is 83.4%. The reaction product is a completely water-soluble rubbery gel. The resulting polymer is water soluble and has an intrinsic viscosity of 29.3 deciliters per gram and a Huggins constant of 0.15.

EXAMPLE 4

An aqueous solution containing 8 pounds, 3 ounces of deionized water, 8 ounces of sodium hydroxide, 14.5 ounces of glacial acrylic acid, 2 pounds, 12 ounces of acrylamide, and 1 pound, 3.25 ounces of anhydrous sodium sulfate are prepared and the pH of this solution adjusted to 9.5 with concentrated sodium hydroxide in accordance with the procedure of Example 3. The solution is then placed in a reaction vessel and flushed with nitrogen for 25 minutes. The solution is then irradiated for 6.5 minutes with gamma rays from a cobalt 60 source at a radiation intensity of 20,000 rads per hour. The resulting gel is removed from the gamma source and allowed to cool to room temperature. The monomer to polymer conversion is about 47% by weight, based on the weight of total monomer originally present in the solution. A portion of the gel is extruded and a weighed amount of the gel strands hardended in an excess of methanol. The hardend strands are ground on a Wiley mill using a 20 mesh screen. The ground product is slurried in methanol, suction filtered, and dried in a vacuum for 24 hours at 36° C. The resulting polymer is soluble in distilled water and has an intrinsic viscosity of 40.0 deciliters per gram and a Huggins constant of 0.0.

EXAMPLE 5

A solution containing 100 milliliters of deionized water, 150 milliliters of a 40% aqueous solution of the dimethyl sulfate quaternary salt of dimethylaminoethyl acrylate, 60 grams of sodium chloride, and 20 grams of acrylamide is prepared and irradiated with gamma rays from a cobalt 60 source in accordance with the procedure of Example 1. The solution is irradiated for 14 minutes at an intensity of 20,000 rads per hour. The resulting product is a nonpourable, rubbery gel. The rubbery gel is then removed from the influence of gamma rays and cooled to room temperature. The monomer to polymer conversion is 83.2%. The polymer is soluble in water and has an intrinsic viscosity of 18.7 deciliters per gram and a Huggins constant of 0.06.

EXAMPLES 6-42

To a reaction vessel containing the indicated amount of deionized water are added to the indicated amounts of monomer and salt. The pH is adjusted to the indicated value using 10 normal sodium hydroxide solution. The solution is flushed with nitrogen gas for 20 minutes and the vessel closed. The sample is irradiated with gamma radiation from cobalt 60 at an intensity of 20,000 rads per hour until the indicated total dose of radiation has been received by the sample. The sample is then removed from the radiation chamber for processing. The intrinsic viscosity and Huggins values are determined by standard techniques. The percent conversion of monomer to polymer is determined by weighing a portion of the reaction product, extracting product with methanol to precipitate the polymer, and drying the polymer in vacuum to constant weight. The weight of the dried polymer divided by the theoretical weight of product that would have been obtained if 100% conversion of monomer was achieved gives the percent conversion of monomer to polymer. The results are given in the following Table I.

TABLE I

| Ex. No. | Water ml. | NaOH gms. | Acrylic Acid gms. | Acryl-amide gms. | (1) DMAEA-Q gms. | (2) DMAEM-Q gms. | Monomer Concentration (%) | NaCl gms. | Na₂SO₄ gms. | K₂HPO₄ gms. | Salt Concentration (%) | pH | Irradiation Time (minutes) | Conversion (%) | Intrinsic Viscosity dl/gm | Huggins Constant |
|---|---|---|---|---|---|---|---|---|---|---|---|---|---|---|---|---|
| 6 | 354 | 12.8 | 23.0 | 70.0 | | | 20 | | 40.0 | | 8 | 9.6 | 16 | 88.6 | 29.3 | 0.15 |
| 7 | 396 | 9.6 | 52.5 | 52.5 | | | 15 | | 25.0 | | 5 | 9.6 | 17 | 78.5 | 21.0 | 0.18 |
| 8 | 927 | 23.9 | 43.1 | 131.2 | | | 15 | | 125.0 | | 10 | 9.6 | 15 | 83.4 | 25.0 | 0.14 |
| 9 | 325 | 11.5 | 20.7 | 63.0 | | | 18 | 80.0 | | | 16 | 9.6 | 11 | 87.2 | 31.0 | 0.04 |
| 10 | 20,357 | 707.8 | 1245.8 | 4190.3 | | | 22 | | 1075.9 | | 6 | 9.6 | 16 | 84.8 | 30.6 | 0.14 |
| 11 | 270 | 6.8 | 12.3 | 64.0 | | | 19.9 | | 50.0 | | 12.4 | 9.6 | 12 | 90.6 | 28.7 | 0.07 |
| 12 | 300 | 1.7 | 3.1 | 76.0 | | | 19.5 | | 30.0 | | 7.3 | 9.6 | 12 | 93.5 | 28.3 | 0.07 |
| 13 | 300 | | | 75.0 | | | 18.3 | | 35.0 | | 8.5 | 9.6 | 13 | 92.5 | 25.0 | 0.10 |
| 14 | 300 | | | 75.0 | | | 17.9 | 45.0 | | | 10.7 | 10.0 | 13 | 100 | 23.5 | 0.12 |
| 15 | 300 | | | 75.0 | | | 17.9 | | | 45.0 | 10.7 | 10.0 | 10 | 91.3 | 26.2 | 0.12 |
| 16 | 320 | | | 60.0 | | | 15.0 | | 20.0 | | 5.0 | 10.0 | 13 | 90.8 | 19.0 | 0.21 |
| 17 | 300 | | | 60.0 | | | 15.0 | | 40.0 | | 10.0 | 10.0 | 13 | 93.7 | 21.0 | 0.16 |
| 18 | 310 | | | 60.0 | | | 15 | 15.0 | 30.0 | | 7.50 | 10.0 | 12 | 95.5 | 19.7 | 0.17 |
| 19 | 310 | | | 60.0 | | | 15 | 10.0 | 15.0 | 10.0 | 7.50 | 10.0 | 12 | 86.7 | 22.1 | 0.14 |
| 20 | 290 | | | 60.0 | | | 15 | 50.0 | 10.0 | | 7.50 | 10 | 10 | 90.0 | 20.9 | 0.13 |
| 21 | 290 | | | 60.0 | | | 15 | | 50.0 | | 12.50 | 10 | 10 | 94.0 | 21.5 | 0.12 |
| 22 | 290 | | | 60.0 | | | 15 | 25.0 | 25.0 | | 12.50 | 10 | 10 | 93.0 | 22.3 | 0.09 |
| 23 | 290 | | | 60.0 | | | 15 | | 25.0 | 25.0 | 12.50 | 10 | 10 | 90.0 | 24.3 | 0.12 |
| 24 | 290 | | | 60.0 | | | 15 | | | 25.0 | 12.50 | 10 | 10 | 89.4 | 26.0 | 0.12 |
| 25 | 200 | | | 60.0 | | | 15 | 25.0 | | | 12.50 | 10 | 10 | 88.1 | 23.3 | 0.08 |
| 26 | 200 | | | 60.0 | | | 15 | 17.0 | 16.0 | 16.0 | 12.50 | 10 | 10 | 88.2 | 24.6 | 0.10 |
| 27 | 220 | | | | 80 | | 25 | | 20 | | 6.25 | 3 | 40 | 100 | 3.4 | 0.09 |
| 28 | 210 | | | | 80 | | 25 | | 30 | | 9.4 | 3 | 40 | 100 | 3.8 | |
| 29 | 200 | | | | 80 | | 25 | | 40 | | 12.5 | 3 | 30 | 100 | 4.8 | |
| 30 | 200 | | | | 60 | | 17.9 | | 60 | | 17.9 | 3 | 40 | 98.2 | 4.2 | |
| 31 | 215 | | | | 80 | | 25 | | | | 18.75 | 3 | 40 | 100 | 4.8 | |
| 32 | 28,468 | 495.5 | 906.0 | 6,653 | | | 18 | 60 | | | 16 | 9.5 | 11 | 89.4 | 33.0 | 0.05 |
| 33 | 28,256 | 1005.0 | 1798.0 | 5,479 | | | 18 | 6,965 | | | 16 | 9.5 | 11 | 82.5 | 32.5 | 0.08 |
| 34 | 621 | 42.2 | 75.8 | 121.0 | | | 22 | 6,951 | | | 14 | 9.5 | 12 | 84.0 | 32.3 | 0.08 |
| 35 | 318 | 25.7 | 46.3 | 49.5 | | | 22 | 140 | | | 12 | 9.5 | 13 | 84.0 | 30.8 | 0.08 |
| 36 | 260 | | | 60 | | 20 | | 60 | | | 6.0 | 3.0 | | 87.3 | 11.8 | 0.36 |
| 37 | 255 | | | 60 | | 20 | | | 24 | | 12.0 | 3.0 | 10 | 90.3 | 12.3 | 0.34 |
| 38 | 290 | | | 60 | 60 | | | 25 | 48 | | 12.5 | 10 | 12 | 88 | 25.4 | 0.1 |
| 39 | 290 | | | 20 | | | | 30 | 30 | 25 | 15.3 | 3.0 | 12 | 63.0 | 11.8 | |
| 40 | 280 | | | 80 | | | | (3) | | | 10 | 9.0 | 14 | 91.6 | 24.4 | |
| 41 | 311.4 | | | | 16.5 | | | (4) | | | 5.2 | 3.0 | 20 | 84.4 | 16.8 | 0.26 |
| 42 | 247 | | | 49.5 | 94 | | | 29.4 | 29.4 | | 14.7 | | | 72.5 | 4 | |

(1) Dimethyl sulfate quaternary salt of dimethylaminoethyl acrylate
(2) Dimethyl sulfate quaternary salt of dimethylaminoethyl methacrylate
(3) 40 grams of ammonium sulfate
(4) 20.6 grams of aluminum sulfate

EXAMPLE 43

325 grams of deionized water are added to a 500 milliliter beaker. 11.5 grams of sodium hydroxide, 20.7 grams of glacial acrylic acid, 63.0 grams of acrylamide, 20 grams of sodium sulfate, and 60 grams of sodium chloride are dissolved in the water. The pH of the resulting solution is adjusted to 9.5 with aqueous sodium hydroxide solution. The solution is then added to an irradiation vessel and flushed with nitrogen for 20 minutes. The solution is irradiated with gamma rays from a cobalt 60 source for 10 minutes at a radiation intensity of 20,000 rads per hour. The reaction product is removed from the radiation source and allowed to stand until it has cooled to room temperature. The resulting product is an aqueous gel of a water-soluble, ultra high molecular weight polymer. The polymer has a higher molecular weight than would be obtained under the same radiation conditions and a comparable amount of a single salt.

EXAMPLE 44

100 milliliters of deionized water is added to a 500 milliliter beaker. Then 150 milliliters of a 40% aqueous solution of the dimethyl sulfate quaternary salt of dimethylaminoethyl acrylate, 20 grams of acrylamide and 60 grams sodium chloride are dissolved in the water. The pH of the resulting mixture is adjusted to 3 by the addition of a small amount of dilute solution of $H_2SO_4$.

The final solution is poured into an irradiation vessel and flushed for 20 minutes with prepurified nitrogen at a flow rate of 3 liters per minute (STP). After flushing, the solution is irradiated with cobalt 60 gamma rays for 14 minutes at a radiation intensity of 20,000 rads/hr. The polymerization raw product is removed from the radiation source at the end of the 14 minute radiation period and the product is a completely water-soluble soft gel. The soft gel is accurately weighed and is added to a beaker containing approximately five times its weight of acetone. The gel is left in the acetone overnight to harden. The hardened gel is ground with a Wiley mill using a 20 mesh screen. The ground product is slurried in acetone, filtered by vacuum filtration, washed three times in the filter with fresh acetone and partially dried on the filter. The semi-dry powder is quantitatively transferred into a wide mouth jar and dried in a vacuum oven for 24 hours at 36° C. The percent solids in the vacuum dried powder is determined by drying a portion of it in a convection oven to constant weight, whereas the amount of sodium chloride in the vacuum dried powder is calculated from the amount of chlorine. The percent monomer to polymer conversion is calculated in accordance with the following equation:

% Conversion =

$$\frac{\text{Weight of dry powder} - \text{weight of sodium chloride (100)}}{\text{Theoretical amount of polymer based on 100\% conversion}}$$

Based on the above equation, conversion of monomer to polymer is calculated at 83.2%.

Both the soft-gel product and the vacuum dried polymer are tested for water-solubility is distilled water and both are found to be completely water-soluble.

The intrinsic viscosity of the dried polymer is measured in 2N NaCl at 25° C. and is 18.7 deciliters/gram.

The Huggins constant for the polymer is calculated from the equation below and is 0.06.

$$K = \frac{\frac{\eta_{sp}}{[C]} - [\eta]}{[\eta]^2 \times [C]}$$

Where:
K = Huggins constant
$\eta_{sp}/[C]$ = reduced specific viscosity in 2N NaCl at 25° C.
$[\eta]$ = intrinsic viscosity in 2N NaCl at 25° C.
$[C]$ = polymer concentration of the solution (g/dl)

EXAMPLE 45

A solution containing 150 milliliters of deionized water, 150 milliliters of a 40% aqueous solution of the dimethyl sulfate quaternary salt of dimethylaminoethyl acrylate and 20 grams of acrylamide is admixed and the pH of the admixture is adjusted to 3 by the addition of a small amount of $H_2SO_4$ solution. The solution is flushd with $N_2$ for 20 minutes and irradiated for 16 minutes at an intensity of 20,000 rads per minute. A polymer gel resulted and the polymer gel is evaluated following the procedures of Example 1. The conversion of monomer to polymer is 83.6%, the intrinsic viscosity is 10.0 deciliters/gram, and the Huggins constant is calculated as 0.25.

EXAMPLES 46–63

Aqueous solutions of monomers are prepared containing the percentage monomer by weight as indicated in Table 1.

The pH values of the monomer solutions are adjusted with aqueous sodium hydroxide solution. Each solution is charged to a radiation vessel which is flushed with nitrogen gas for 20 minutes and the vessel is closed. The monomer solution is irradiated with gamma radiation from a cobalt 60 source at an intensity of 20,000 rads/hr. for the times indicated. Radiation is then stopped, the sample is removed from the radiation chamber for processing following the general procedure set forth in Example 44. Conversion, intrinsic viscosity and Huggins constant are determined for each sample utilizing the methods described in Example 44. Results achieved from conducting experiments of Examples 46–63 are set forth in Table II.

TABLE II

Examples 46–63

| Ex. No. | Monomer(s) (wt. ratio) | Monomer wt. (%) | pH | Salt Type, | wt.% | Dose Rate (Kilorad/hr) | Irradiation Time (Min.) | Conversion % | Intrinsic Viscosity (dl/g) | Huggins Constant (k) |
|---|---|---|---|---|---|---|---|---|---|---|
| 46 | 70% acrylamide 30% sodium acrylate | 20 | 9.6 | — | — | 20.0 | 21.0 | 76.7 | 24.8 | 0.16 |
| 47 | " | " | " | Na$_2$SO$_4$ | 8.0 | " | 16.0 | 88.6 | 29.3 | 0.15 |
| 48 | " | 15.0 | " | — | — | " | 20.0 | 77.5 | 17.2 | 0.22 |
| 49 | " | " | " | Na$_2$SO$_4$ | 5.0 | " | 17.0 | 78.5 | 21.0 | 0.18 |

TABLE II-continued
Examples 46–63

| Ex. No. | Monomer(s) (wt. ratio) | Monomer wt. (%) | pH | Salt Type, | wt.% | Dose Rate (Kilorad/hr) | Irradiation Time (Min.) | Conversion % | Intrinsic Viscosity (dl/g) | Huggins Constant (k) |
|---|---|---|---|---|---|---|---|---|---|---|
| 50 | " | " | " | " | 10.0 | " | 15.0 | 83.4 | 25.0 | 0.14 |
| 51 | " | 30.0 | " | — | — | " | 8.0 | 48.5 | 33.5 | 0.00 |
| 52 | " | 19.0 | " | — | — | " | 31.0 | 90.3 | 21.8 | 0.22 |
| 53 | " | 18.0 | " | NaCl | 16.0 | " | 11.0 | 87.2 | 31.0 | 0.04 |
| 54 | " | 22.0 | " | Na$_2$SO$_4$ | 6.0 | " | 16.0 | 84.8 | 30.6 | 0.14 |
| 55 | " | 30.0 | " | " | 5.0 | " | 6.5 | 47.2 | 40.0 | 0.00 |
| 56 | 80% acrylamide 20% sodium acrylate | 21.0 | " | — | — | " | 32.5 | 92.0 | 21.8 | 0.19 |
| 57 | " | 19.9 | " | Na$_2$SO$_4$ | 12.4 | " | 12.0 | 90.6 | 28.7 | 0.07 |
| 58 | 95% acrylamide 5% sodium acrylate | 20.0 | " | — | — | " | 24.5 | 93.0 | 21.3 | 0.19 |
| 59 | " | 19.5 | " | Na$_2$SO$_4$ | 7.3 | " | 12.0 | 93.5 | 28.3 | 0.07 |
| 60 | 100% acrylamide | 18.3 | 10.0 | — | — | " | 16.0 | 86.5 | 19.8 | 0.19 |
| 61 | " | " | " | Na$_2$SO$_4$ | 8.5 | " | 12.0 | 92.5 | 25.0 | 0.10 |
| 62 | " | 17.9 | " | NaCl | 10.7 | " | 13.0 | 100.0 | 23.5 | 0.12 |
| 63 | " | " | " | Na$_2$HPO$_4$ | 10.7 | " | 10.0 | 87.0 | 26.2 | 0.12 |

EXAMPLES 64–75

The following examples are used to compare the intrinsic viscosity of polymer resulting from radiation induced polymerization of monomer solutions in the presence or absence of salt with chemically initiated polymerization of monomer solutions in the presence or absence of salt. The radiation polymerization reactions are conducted following the procedures of Examples 44–64. The chemically initiated polymerization reactions, Examples 68, 69 and 70, are carried out following the procedure set forth below except for the time of the irradiation:

340 milliliters of deionized H$_2$O are added to a 1,000 milliliter beaker. 7.7 grams of NaOH pellets are dissolved in the water. 13.8 grams of glacial acrylic acid are added to the resulting NaOH solution. To the resulting sodium acrylate solution, 42 grams of acrylamide are added. The solution is stirred until the acrylamide is completely dissolved. The pH of the resulting clear solution is adjusted to 9.6 with NaOH solution. The adjusted solution is transferred into a bell-type glass reaction kettle about 4 inches in diameter. The kettle is covered with a special cover provided with 3 openings. A thermometer is inserted through the center opening of the kettle into the solution. The solution is flushed with N$_2$ for 20 minutes at 5 liters/minute through the side openings of the cover. At the end of flushing the openings are closed and heat is applied to the kettle until the temperature of solution reaches 60° C. At that time 1 milliliter of 2% potassium peroxydisulfate solution is added to the kettle and the heat is removed. Reaction is started and is allowed to proceed. After 30 minutes of reaction, the temperature of the reaction mixture reaches 76.8° C. At that time the reaction vessel is cooled with cold water to room temperature. The reaction mixture is a soft gel-type material and completely water-soluble. 100 grams of the soft gel is processed with methanol following the polymer workup procedure of Example 44 and evaluated for percent conversion of monomer to polymer.

Examples 73, 74 and 75 are carried out following the general procedure for Example 68. The results of the polymerization reaction of Examples 64–75 are set forth in Table III.

TABLE III
Examples 64–75

| Ex. No. | Monomer(s) (wt. ratio) | Monomer wt. (%) | pH | Na$_2$SO$_4$ wt. (%) | Dose Rate (Kilorad/hr) | Initiator (PPM) | Reaction or Irradiation Time(Min.) | Conversion (%) | Intrinsic Viscosity (dl/g) | Huggins Constant (k) |
|---|---|---|---|---|---|---|---|---|---|---|
| 64 | 70% acrylamide 30% sodium acrylate | 15.0 | 9.5 | — | 20.0 | — | 20.0 | 77.5 | 17.2 | 0.22 |
| 65 | " | " | " | 5.0 | " | — | 17.0 | 78.4 | 21.0 | 0.18 |
| 66 | " | " | " | 10.0 | " | — | 15.0 | 83.4 | 25.0 | 0.14 |
| 67 | " | " | " | — | — | 50 | 30.0 | 68.8 | 8.4 | 0.40 |
| 68 | " | " | " | 5.0 | — | 50 | 20.0 | 87.7 | 8.2 | 0.39 |
| 69 | " | " | " | 10.0 | — | 50 | 14.0 | 98.0 | 7.7 | 0.44 |
| 70 | 100% acrylamide | 15.0 | 10.0 | — | 20.0 | — | 16.0 | 82.7 | 17.4 | 0.27 |
| 71 | " | " | " | 5.0 | " | — | 13.0 | 90.8 | 19.0 | 0.21 |
| 72 | " | " | " | 10.0 | " | — | 13.0 | 93.7 | 21.0 | 0.16 |
| 73 | " | " | " | — | — | 25 | 23.0 | 89.5 | 17.7 | 0.33 |
| 74 | " | " | " | 5.0 | — | 25 | 12.0 | 80.5 | 18.0 | 0.34 |
| 75 | " | " | " | 10.0 | — | 25 | 18.0 | 86.2 | 15.6 | 0.37 |

Flooding Tests

EXAMPLE 76

Copolymer "A" is obtained by the process technology taught herein. It has an intrinsic viscosity of 28 deciliters per gram and the polymer activity is 70%. Copolymer "B" is prepared by the teachings of U.S. Pat. No. 3,841,401 and has an intrinsic viscosity of 29 deciliters per gram and an activity of 88%. Both polymers are made from a monomer concentration of 40% sodium acylate and 60% acrylamide. Six inch radial sandstone cores (obtained from the Henry reservoir, Robinson, Illinois, U.S.A.) are placed in a tertiary condition by first flooding with water containing about 5,900 ppm of TDS (total dissolved solids), thereafter flooded with crude oil (viscosity of 7 cp at 23° C.) until irreducible water saturation, and then flooded with water containing 5,900 ppm of TDS until irreducible oil saturation. These cores are flooded with 7% PV (pour volume) of identical micellar solutions followed by 10% PV of an aqueous polymer solution containing 500 ppm of the polymer followed by 53% PV of an aqueous polymer solution (contains 258 ppm of polymer "B" or 326 ppm of polymer "A") and this, in turn, followed by 30% PV of an aqueous polymer solution containing 50 ppm of the polymer, and thereafter 50% PV of water. All water used in the aqueous polymer solutions and the drive water in runs 1 and 3 contain 15,554 ppm of TDS and 196 ppm of calcium cation and 89 ppm of magnesium cation, whereas runs 2 and 4 are made up with water containing 16,250 ppm of TDS and 0 ppm of calcium and magnesium cations. Results of the core floods are as follows:

TABLE IV

| RUN | POLYMER | K,md | $\phi$ | $SO_1$* | RECOVERY (% of oil in place) |
|---|---|---|---|---|---|
| 1 | B* | 54 | 0.217 | 0.307 | 45 |
| 2 | B* | 128 | 0.227 | 0.300 | 56 |
| 3 | A | 130 | 0.228 | 0.243 | 58 |
| 4 | A | 45 | 0.224 | 0.301 | 46 |

*Prior Art
K = Permeability of Core
$\phi$ = Porosity
$SO_1$* = Initial Oil Saturation

EXAMPLE 77

Polymer "A" is compared with prior art polymers. Dow Pusher polymer 700 (a partially hydrolyzed, high molecular weight polyacrylamide having an intrinsic viscosity of 15 dcl/gm, about 30% of the acrylamide groups are hydrolyzed, marketed by Dow Chemical Company, Midland, Michigan, U.S.A.), Nalco 586 polymer (a copolymer of 30% sodium acrylate and 70% acrylamide having an intrinsic viscosity of 17 dcl/gm, manufactured by Nalco Chemical Company, Chicago, Illinois, U.S.A.), and Kelzan MF polymer (a polysaccharide polymer produced by Kelco Company, 75 Terminal Avenue, Clark, New Jersey). The cores are placed in a tertiary condition and are then flooded with 6% PV of a micellar solution followed by 20% PV of water containing Table VI indicated polymer concentrations followed by 50% of Table VI indicated polymer concentrations, this in turn followed by water to displace the previously injected slugs through the cores. The water used contains 5,605 ppm of TDS, 128 ppm of calcium cation, and 96 ppm of magnesium cation. Table VI illustrates the permeability and porosity of the cores and the flooding data.

TABLE VI

| Run | Polymer | K,md | $\phi$ | $SO_1$* | Polymer Concentration 20% PV (ppm) | Polymer Concentration 50% PV (ppm) | Recovery (% Oil In Place) |
|---|---|---|---|---|---|---|---|
| 5 | Dow 700 | 95 | 0.218 | 0.296 | 1104 | 368 | 46 |
| 6 | Dow 700 | 89 | 0.218 | 0.304 | 1104 | 368 | 43 |
| 7 | Nalco 586 | 105 | 0.218 | 0.282 | 1299 | 433 | 59 |
| 8 | Nalco 586 | 67 | 0.201 | 0.310 | 1299 | 433 | 47 |
| 9 | Kelzan MF | 67 | 0.191 | 0.309 | 405 | 135 | 35 |
| 10 | Kelzan MF | 55 | 0.204 | 0.258 | 405 | 135 | 44 |
| 11 | A | 197 | 0.222 | 0.302 | 1131 | 377 | 69 |
| 12 | A | 168 | 0.229 | 0.330 | 1131 | 377 | 65 |

Although this invention hs been described with reference to specific reaction conditions, reactants, flooding conditions, etc., it will be apparent that still other different and equivalent conditions may be substituted for those specifically described, all within the spirit and scope of this invention.

What is claimed is:

1. A process for recovering hydrocarbon from a subterranean formation having an injection means in fluid communication with a production means comprising injecting into the formation an aqueous slug comprised of a water-soluvble, substantially linear, high molecular weight polymer obtained by a process which comprises irradiating an aqueous solution having a pH of about 2 to about 12 and containing about 10% to about 40% by weight of: (a) an ethylenically unsaturated monomer having the formula (I):

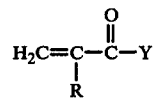

(b) mixtures of monomers of formula (I), or (c) mixtures of at least one of the monomers of formula (I) with up to 50% by weight of an ethylenically unsaturated monomer selected from the group consisting of vinyl sulfonic acid, alkali metal salts of vinyl sulfonic acid, diacetone acrylamide, and mixtures thereof, wherein R represents hydrogen or methyl and Y represents $-NH_2$, $-OM$,

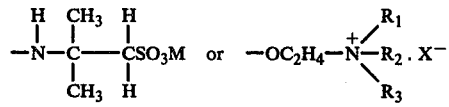

wherein M is hydrogen, $H_4N^+$, alkali metal, or any other cation yielding a water-soluble, polymerizable compound, $R_1$, $R_2$, and $R_3$ are 1 to 4 carbon alkyl radicals and X is an anion, and containing at least about 3% by weight of a salt selected from the group consisting of potassium sulfate, potassium chloride, potassium fluoride, potassium bisulfate, tribasic potassium phosphate, dibasic potassium phosphate, monobasic potassium phosphate, sodium sulfate, sodium bisulfate, sodium chloride, tribasic sodium phosphate, dibasic sodium phosphate, monobasic sodium phosphate, lithium sulfate, lithium bisulfate, lithium chloride, ammonium sulfate, ammonium bisulfate, ammonium chloride, tribasic ammonium phosphate, dibasic ammonium phosphate, monobasic ammonium phosphate, ammonium fluoride, aluminum sulfate, aluminum chloride, and mixtures thereof, with high-energy ionizing radiation at an intensity of about 1,000 to about 200,000 rads per hour to a total radiation dose of about 1,000 to about 30,000 rads, to form an aqueous solution of a water-soluble, substantially linear high molecular weight polymer, provided that when the aqueous solution contains at least 3% by weight of a water-soluble salt selected from the group consisting of aluminum sulfate, aluminum chloride, and mixtures thereof, the unsaturated monomer consists of about 5% to about 100% of cationic monomer and about 95% to 0% nonionic monomer, and the aqueous solution has a pH of about 2 to about 5, and provided that the aqueous solution has a pH of about 7 to about 9 when the water-soluble salt is an ammonium salt, and thereafter displacing the aqueous slug toward the production well to recover hydrocarbon therethrough.

2. A process of claim 1 wherein the radiation intensity is about 5,000 to about 200,000 rads per hour and the radiation dose is about 1,000 to about 30,000 rads.

3. A process of claim 1 wherein the radiation intensity is about 5,000 to about 100,000 rads per hour and the radiation dose is about 1,000 to about 15,000 rads.

4. A process of claim 2 wherein the monomer concentration is about 10% to about 30% by weight, based on the total weight of solution.

5. A process of claim 2 wherein the aqueous solution contains at least one monomer selected from the group consisting of acrylamide and methacrylamide and at least one monomer selected from the group consisting of alkali metal and ammonium salts of acrylic acid and alkali metal and ammonium salts of methacrylic acid.

6. A process of claim 5 wherein the monomer concentration is about 10 % to about 30% by weight, based on the total weight of solution.

7. A process of claim 6 wherein the monomer is a mixture of about 50 to about 99 weight percent of acrylamide and about 1% to about 50% by weight of at least one monomer selected from the group consisting of acrylic acid, and alkali metal salts of acrylic acid.

8. A process of claim 7 wherein the monomer mixture contains about 50% to about 80% by weight of acrylamide and about 50% to about 20% by weight of sodium acrylate.

9. A process of claim 1 wherein a mixture of salts is used.

10. A process of claim 1 wherein the salt is sodium chloride.

11. A process of claim 1 wherein the salt is sodium sulfate.

12. A process of claim 1 wherein the salt is a mixture of sodium chloride, sodium sulfate, and potassium dibasic phosphate 13. A process of claim 1 wherein the salt is a mixture of sodium chloride and sodium sulfate.

14. A process of claim 1 wherein the salt is a mixture of sodium chloride and potassium dibasic phosphate.

15. A process of claim 1 wherein the salt is a mixture of sodium sulfate and potassium dibasic phosphate.

16. A process of claim 1 wherein the percent conversion of monomer to polymer is about 80% to 100% by weight.

17. A process of claim 1 wherein the salt concentration is about 4% by weight, based on the total weight of solution to saturation at 35° C.

18. A process of claim 1 wherein an aqueous surfactant slug is injected before the aqueous polymer slug.

19. A process of claim 18 wherein the aqueous surfactant slug is a micellar dispersion.

20. A process of claim 1 wherein the aqueous solution contains at least one monomer selected from the group consisting of acrylamide and methacrylamide and at least one monomer selected from the group consisting of quaternary salts of dimethylaminoethyl acrylate and dimethylaminoethyl methacrylate.

21. A process of claim 1 wherein the salt is selected from the group consisting of sodium chloride, sodium sulfate, sodium bisulfate, potassium chloride, potassium sulfate, potassium bisulfate, ammonium chloride, ammonium sulfate, ammonium bisulfate, and mixtures thereof.

* * * * *

UNITED STATES PATENT OFFICE

CERTIFICATE OF CORRECTION

Patent No. 4,137,969                Dated   February 6, 1979

Inventor(s)   Phalangas et al

It is certified that error appears in the above-identified patent and that said Letters Patent are hereby corrected as shown below:

[73] Assignee:   Delete Marathon Oil Company, Findlay, Ohio and insert -- Hercules Incorporated, Wilmington, Delaware

UNITED STATES PATENT OFFICE
CERTIFICATE OF CORRECTION

Patent No. 4,137,969                Dated Feb. 6, 1979

Inventor(s) Charalambos J. Phalangas; Restaino and HanBo YuN

It is certified that error appears in the above-identified patent and that said Letters Patent are hereby corrected as shown below:

| | |
|---|---|
| Col. 1, line 35 | Delete "is" and insert --in-- |
| Col. 1, line 36 | After "teaches" insert --improved-- |
| Col. 1, line 46 | Delete "in acrylamide" and insert --of acrylamide- |
| Col. 4, line 6 | Delete "monome" and insert --monomer-- |
| Col. 4, line 30 | After "monobasic" insert --ammonium-- |
| Col. 16, line 8 | Delete "is" and insert --in-- |
| Col. 16, line 32 | Delete "flushd" and insert --flushed- |
| Col. 16, line 38 | Delete "10.0" and insert --10.1-- |

Claim 1, col. 20, line 3, delete "water-soluvble" and insert --water-soluble--

Signed and Sealed this

Twenty-second Day of May 1979

[SEAL]

Attest:

RUTH C. MASON
Attesting Officer

DONALD W. BANNER
Commissioner of Patents and Trademarks